(12) United States Patent
Morgan et al.

(10) Patent No.: US 9,027,860 B2
(45) Date of Patent: May 12, 2015

(54) SPRAY NOZZLE ASSEMBLIES

(76) Inventors: Stuart Morgan, Cheltenham (AU); Sean Morgan, Cheltenham (AU)

( * ) Notice: Subject to any disclaimer, the term of this patent is extended or adjusted under 35 U.S.C. 154(b) by 209 days.

(21) Appl. No.: 12/989,130

(22) PCT Filed: Apr. 22, 2009

(86) PCT No.: PCT/AU2009/000502
§ 371 (c)(1),
(2), (4) Date: Oct. 22, 2010

(87) PCT Pub. No.: WO2009/129571
PCT Pub. Date: Oct. 29, 2009

(65) Prior Publication Data
US 2011/0036931 A1 Feb. 17, 2011

(30) Foreign Application Priority Data
Apr. 22, 2008 (AU) ................. 2008902000

(51) Int. Cl.
B05B 1/00 (2006.01)
B05B 1/14 (2006.01)
B05B 1/34 (2006.01)
B01D 1/18 (2006.01)
B05B 1/30 (2006.01)

(52) U.S. Cl.
CPC ................ *B05B 1/3426* (2013.01); *B01D 1/18* (2013.01); *B05B 1/3006* (2013.01)

(58) Field of Classification Search
USPC .............. 239/533.1, 569, 591, 600, 463, 570, 239/288, 288.5, 288.3, 468, 590, 596; 137/524, 530, 531, 570
See application file for complete search history.

(56) References Cited

U.S. PATENT DOCUMENTS

| | | | |
|---|---|---|---|
| 4,251,032 A * | 2/1981 | Werding | 239/323 |
| 4,613,079 A | 9/1986 | Mains | |
| 4,988,043 A * | 1/1991 | Lechler | 239/597 |
| 5,149,546 A | 9/1992 | Nelson | |
| 5,275,340 A | 1/1994 | Haruch | |
| 5,873,528 A * | 2/1999 | Lewis et al. | 239/135 |
| 6,394,366 B1 * | 5/2002 | Adams | 239/463 |
| 6,460,344 B1 | 10/2002 | Steinthorsson et al. | |
| 6,953,161 B2 * | 10/2005 | Laursen et al. | 239/461 |
| 7,611,080 B2 * | 11/2009 | Peterson et al. | 239/472 |
| 7,681,811 B2 * | 3/2010 | Geser et al. | 239/548 |
| 2004/0134670 A1 | 7/2004 | Orr et al. | |
| 2006/0175428 A1 | 8/2006 | Prociw et al. | |
| 2006/0289404 A1 * | 12/2006 | Hawley et al. | 219/121.47 |
| 2009/0032619 A1 * | 2/2009 | Morgan et al. | 239/533.1 |

* cited by examiner

Primary Examiner — Ryan Reis
(74) Attorney, Agent, or Firm — Edwin D. Schlinder

(57) ABSTRACT

A spray nozzle assembly includes a body and a spray nozzle retainer cap, and further including a device for protecting wear components from damage. Preferably, housings are provided within the spray nozzle assembly for protecting wear components, such as a swirl chamber and an orifice disc from damage. A sealing device is included within the nozzle assembly, which is subject to only compressive forces.

22 Claims, 1 Drawing Sheet

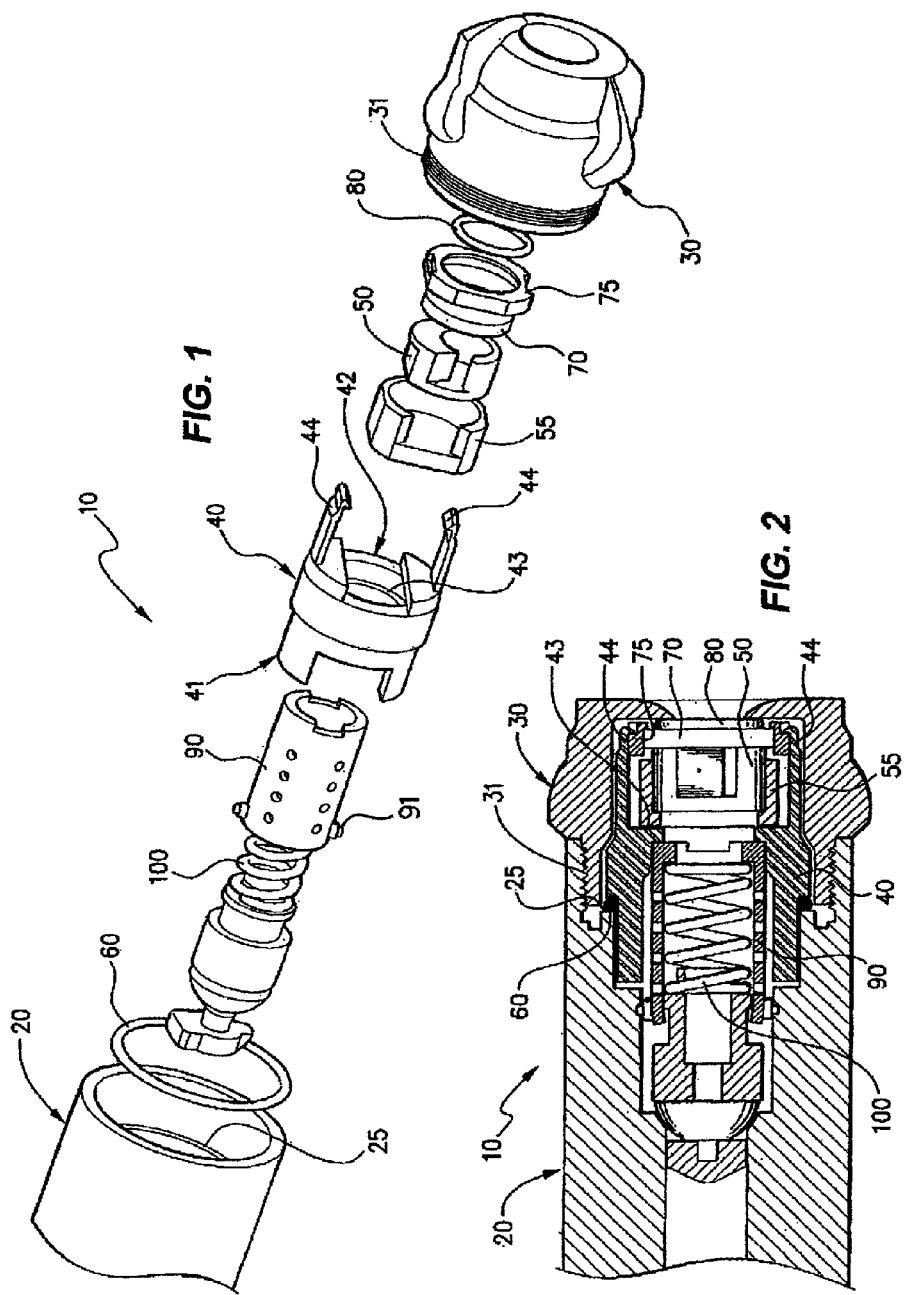

SPRAY NOZZLE ASSEMBLIES

AREA OF THE INVENTION

This invention relates in general to spray nozzle assemblies and in particular to the type of spray nozzle having a check valve which is specifically adapted to be used with spray drying nozzles, but could also be used in association with other nozzles.

BACKGROUND TO THE INVENTION

For ease of description, we shall refer to such a spray nozzle assembly in terms of one associated with spray drying of milk.

In general spray nozzles which are provided with swirl chambers and orifice discs have these components manufactured from tungsten carbide or the like which is very hard but also brittle and prone to damage when dropped or other wise roughly treated during assembly and disassembly.

When ordinary spray nozzles are used for spray drying milk a certain percentage of the liquid simply fell as drops from the nozzles, without being atomized, and this material could well lead to pollution of the product.

To avoid this problem a unitary check valve was developed for spray drying nozzles, and other nozzles, which caused little restriction in the flow through the nozzle and which, at the same time, did not have any parts likely to be passed into the fluid stream.

Conventional check valves however have sealing problems when operated at high pressures and are not necessarily as compact as would be desirable.

OUTLINE OF THE INVENTION

It is an object of the invention to ameliorate the above problems associated with spray nozzles, and particularly those used in association with check valves, and to provide general improvements in the assembly and construction of spray nozzle components.

The invention in one aspect is the provision of housings within a spray nozzle assembly for protecting wear components such as the swirl chamber and orifice disc from damage.

It is preferred that these housings be manufactured from a durable material such as stainless steel however any appropriate material is included within the scope of the invention.

It is further preferred that the orifice disc and the swirl chamber be retained in their respective housings by means of a peened over retaining edge about their peripheries thus making these parts and respective housings unitary objects.

The invention in a second aspect is a clasp device used to locate and secure the swirl chamber and orifice disc components within the spray nozzle retainer cap.

The arrangement is such that the wear parts and housings clip in to the clasp device in which they are retained by means of the arm members. The precise means whereby this is effected is not restricted in the invention. A preferred means however is the engagement of the terminal ends of the arms with corresponding lugs on the engaging flats of the wear parts.

The invention in a third aspect is the provision within a spray nozzle assembly of a first O ring which seats within a lance adapter and is held compressively by the retainer cap when assembled and a second O ring within the retainer cap which compressively seals under the load applied by a clasp used to locate the swirl chamber and orifice disc components.

The arrangement is such that each O ring is compressed independently of the other.

Previously such sealing had been effected by means of flat washers or axial gland seals, both of these being less effective at high pressures. This could be partially addressed with support backup rings however are difficult to install on a regular basis and expensive to replace and have limitations at elevated pressures. The use of the O rings as described here addresses these problems and are highly effective in such a static arrangement at much higher pressure levels than previously possible.

In a further aspect of the invention wear parts in a spray nozzle are provided with durable housings into which they are located.

It is preferred that these housings be applied to parts such as swirl chambers and orifice discs.

In a further embodiment of the invention a swirl chamber or orifice plate can be provided which is smaller in diameter than that which would be conventionally used such that, when a housing is applied about their peripheries, the resulting diameter of each is then that of conventional such devices.

It is therefore preferred that these be able to be retro fitted to existing spray nozzle assemblies.

In an embodiment of the invention in which a check valve is included the perforated sleeve covering the valve is provided with locating pins positioned at the end of the sleeve furtherest from the nozzle in order to minimise the length of the spray nozzle assembly.

The invention in a fourth aspect provides a threaded end on the retainer cap which engages with an internal thread in the lance adapter such that no exterior threads are provided on the assembled spray nozzle assembly and as such damage to external threads cannot occur.

In order that the invention may be more readily understood we shall describe by way of non limiting example one particular embodiment of the invention with reference to the accompanying drawings.

BRIEF DESCRIPTION OF THE DRAWING FIGURES

FIG. 1 Shows an exploded diagram of the components of the invention.

FIG. 2 Shows an assembled section view of the nozzle assembly of the invention;

DESCRIPTION OF EMBODIMENTS OF THE INVENTION

In a first embodiment of the invention 10 a spray nozzle is provided, within its lance adapter 20 and retainer cap 30 components, with a clasp device 40 which at a first end 41 seats compressively against an O ring 60 located in sealing arrangement within the lance adapter.

An opposing end of the clasp 42 is provided with a seat 43 for a swirl chamber 50 and orifice disc 70 assembly, the clasp also being provided with arm members 44 which pass over the wear parts and compressively abut an O ring 80 within the retainer cap which provides a seal.

During use of such a spray nozzle it is common for the material being sprayed to adhere to the contacting components however with the device of the invention the provision of this clasp permits the wear parts to be simply removed upon rotation of the clasp thereby avoiding the damage to the wear parts caused by the conventional pressing out of the wear parts by an arbor press or other such means.

The swirl chamber 50 is located within a housing 55 of stainless steel to provided a strong swirl chamber assembly. Similarly the orifice disc 70 is surrounded by a stainless steel housing 75 which protects it from any damage that might otherwise result from dropping or handling during assembly and disassembly.

The swirl chamber and the orifice disc are retained in their housings as unitary devices by the peening of a peripheral edge of each housing over these devices.

These wear items are manufactured typically from tungsten carbide which is relatively expensive and brittle. By providing smaller diameter orifice discs and swirl chambers expense is spared as well as the devices being protected from damage by their housings.

It is also envisaged that these wear items be provided in situ in their housings at the same size as conventional such items which also permits them to be retro fitted to existing spray nozzle assemblies.

Although the materials described are preferred they are not restricted in the invention.

In a second embodiment of the invention a check valve is provided within the spray nozzle assembly. In this embodiment the first end 41 of the clasp passes generally over the perforated sleeve 90 covering the valve spring 100. This first end of the clasp in turn seats compressively against an O ring 60 located against a shoulder 25 within the lance adapter 20 to form a seal.

The perforated sleeve 90 cover the valve spring 100 is provided with locating pins 91, which are positioned at the end of the perforated sleeve 90, furthest from the nozzle 30, for minimizing the length of the spray nozzle assembly 10.

The lance adapter 20 and end cap 30 engage by means of a screw thread 31 located within one end of the lance adapter and the exterior of one end of the end cap the arrangement being such that when screw connection of these components has been effected no external thread is present which could be damaged by contact.

Whilst we have, in this specification, described one general form of a spray nozzle and one particular arrangement of the nozzle with a check valve, it will be understood that other spray nozzle forms, which operate in the same manner as that described, can readily be utilised in the invention.

All such modifications and applications are deemed to be within the spirit and scope of the invention.

The claims defining the invention are as follows:

1. A spray nozzle assembly, comprising:
   an engageable lance adaptor with components housed within a body formed from said engageable lance adaptor;
   a spray nozzle retainer cap comprising a substantially cylindrical skirt connected to an end of said engageable lance adaptor;
   a wear part housing for protecting one or more internal wear components from damage; and,
   a clasp having a plurality of arm members for retaining said one or more internal wear components in said body, each arm member of said plurality of arm members being an elongate structure extending longitudinally from a side of said clasp and passing over said one or more internal wear components, said wear part being substantially disc-shaped or cylindrically-shaped and having a flat upper part for engaging a terminal end of each said arm member of said plurality of arm members.

2. The spray nozzle assembly according to claim 1, wherein said one or more internal wear components include a swirl chamber.

3. The spray nozzle assembly according to claim 2, wherein said wear part housing is removable from said clasp by moving said wear part housing laterally relative to said clasp.

4. The spray nozzle assembly according to claim 1, further comprising:
   a first O-ring within said body seated within said engageable lance adaptor and compressively held via said spray nozzle retainer cap when said spray nozzle assembly is assembled; and,
   a second O-ring within said spray nozzle retainer cap compressively sealing under a load applied by said clasp.

5. The spray nozzle assembly according to claim 4, wherein said first O-ring and said second O-ring are compressed independently of one another.

6. The spray nozzle assembly according to claim 1, further comprising a check valve with a perforated sleeve covering said check valve, said perforated sleeve having locating pins positioned at an end of said perforated sleeve farthest from a spray nozzle for minimizing length of said spray nozzle assembly.

7. The spray nozzle assembly according to claim 1, wherein said spray nozzle retainer cap includes a threaded end for engaging with an internal thread in said engageable lance adapter, so that no exterior threads are provided on said spray nozzle assembly and no damage to external threading can occur.

8. The spray nozzle assembly according to claim 1, wherein said one or more internal wear components include an orifice disk.

9. The spray nozzle assembly according to claim 2, wherein said one or more internal wear components comprise an orifice disk and said swirl chamber.

10. The spray nozzle assembly according to claim 9, wherein said swirl chamber and said orifice disk are located in said wear part housing.

11. The spray nozzle assembly according to claim 9, wherein said wear part housing comprises two separate wear part housing portions with said swirl chamber and said orifice disk being retained in separate said wear part housing portions.

12. The spray nozzle assembly according to claim 1, wherein said clasp is removable from said body via rotation of said clasp relative to said spray nozzle retainer cap for releasing said clasp.

13. The spray nozzle assembly according to claim 1, wherein said clasp passes over said one or more internal wear components for retaining said one or more internal wear components in said body.

14. A spray nozzle assembly, comprising:
    components housed within a body formed from an engageable lance adaptor;
    a spray nozzle retainer cap connected to an end of said engageable lance adaptor;
    means for protecting internal wear components from damage; and,
    a check valve with a perforated sleeve covering said check valve, said perforated sleeve having locating pins positioned at an end of said perforated sleeve farthest from a spray nozzle for minimizing length of said spray nozzle assembly.

15. The spray nozzle assembly according to claim 14, wherein said components include a swirl chamber and an orifice disk.

16. The spray nozzle assembly according to claim 15, further comprising:

a first O-ring within said body seated within said engageable lance adaptor and compressively held via said spray nozzle retainer cap when said spray nozzle assembly is assembled; and, a second O-ring within said spray nozzle retainer cap compressively sealing under a load applied by a clasp for locating said swirl chamber and said orifice disc.

17. The spray nozzle assembly according to claim 16, wherein said first O-ring and said second O-ring are compressed independently of one another.

18. The spray nozzle assembly according to claim 16, wherein said clasp is removable from said body via rotation of said clasp relative to said spray nozzle retainer cap for releasing said clasp.

19. The spray nozzle assembly according to claim 14, wherein said spray nozzle retainer cap includes a threaded end for engaging with an internal thread in said engageable lance adapter, so that no exterior threads are provided on said spray nozzle assembly and no damage to external threading can occur.

20. The spray nozzle assembly according to claim 1, wherein said plurality of arm members comprises a first arm member and a second arm member, each of said first arm member and said second arm member extending longitudinally on a side of said clasp with said second arm member being opposed to said first arm member for retaining said one or more internal wear components in said body, each of said first arm member and said second arm member extending from a seat of said clasp for seating said one or more internal wear components.

21. The spray nozzle assembly according to claim 1, wherein at least one arm member of said plurality of arm members comprises a terminal end that engages a flat of the wear part.

22. The spray nozzle assembly according to claim 21, wherein said terminal end comprises a lug.

* * * * *